UNITED STATES PATENT OFFICE.

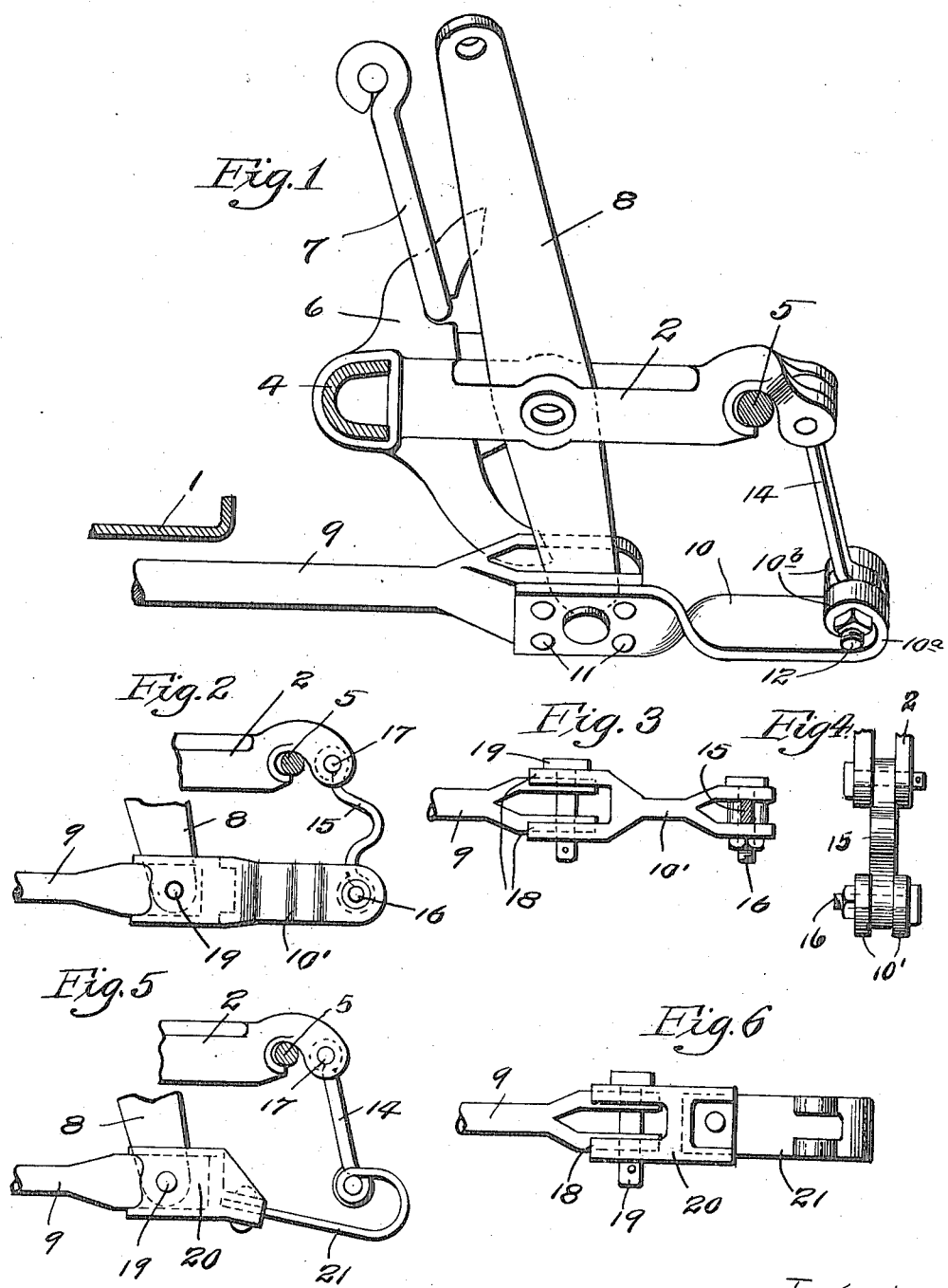

CHARLES HAINES WILLIAMS, OF CHICAGO, ILLINOIS, ASSIGNOR TO CHICAGO RAILWAY EQUIPMENT COMPANY, OF CHICAGO, ILLINOIS, A CORPORATION OF ILLINOIS.

BRAKE-BEAM-SUPPORTING ATTACHMENT.

1,221,938.  Specification of Letters Patent.  Patented Apr. 10, 1917.

Application filed February 14, 1917. Serial No. 148,553.

*To all whom it may concern:*

Be it known that I, CHARLES HAINES WILLIAMS, a citizen of the United States, residing at the city of Chicago, county of Cook, State of Illinois, have invented a certain new and useful Improvement in Brake-Beam-Supporting Attachments, of which the following is a full, clear, and exact description, such as will enable others skilled in the art to which it appertains to make and use the same, reference being had to the accompanying drawings, forming part of this specification.

This invention relates broadly to railway rolling stock, and specifically to an improvement in that portion of the brake gearing which is designed for the support and guidance of the brake beam and known as the third point support.

There is an arrangement familiar in present practice whereby the brake beam strut at its end adjacent the tension member is connected by a depending link or connection with the lower brake rod or lever connection of the brake rigging, which brake rod is carried below the brake beam and connects the lower arms of the associated brake levers.

It is the purpose of my present invention to provide an improved form of connection for use in such an arrangement whereby brake rigging not specially designed to include the third point support above described may be equipped therewith at comparatively little cost and without necessitating substitution of parts in the mechanism.

In the accompanying drawings, Figure 1 is a detail of brake mechanism partly in section and showing one form in which my invention may be embodied;

Fig. 2 is a detail, showing parts in elevation, of a modified form of my invention;

Fig. 3 is a top view of the connecting rod attachment illustrated in Fig. 2;

Fig. 4 is a front elevation of the supporting link used in this form;

Fig. 5 is a detail, showing parts in elevation, of still another modified form of my invention; and Fig. 6 is a detail showing a top view of the connecting rod attachment illustrated in Fig. 4.

Referring to these illustrations in detail by means of the reference characters applied, let it be understood that 1 represents the spring plank of the truck; 2 the brake beam strut; 4 the compression member of the brake beam; 5 the tension member thereof; 6 the brake head; 7 its hanger; and 8 the brake lever which is pivoted in the slot of the strut 2. At the extremity of its lower arm, the lever 8 is connected to one end of the lower brake rod 9, the other end of which is similarly connected to the associated brake lever on the other side of the spring plank. The customary brake gear is arranged for the conventional operation of the brake levers. All the above named parts are familiar in truck equipment, and as illustrated are of the conventional and approved M. C. B. standard forms.

By way of fitting this standard equipment to provide the third point support for the brake beam, I provide, for attachment at the extremity of the brake rod 9, an extension member 10. That illustrated in Fig. 1 is in the form of a strip of resilient or spring metal formed at one extremity for attachment to the rod 9 by any suitable attaching means 11, and shaped at its other extremity with an upward turn or bend 10$^a$ terminating in a seat 10$^b$ for a pivot bolt 12. A link 14 forms a pivotal or oscillating connection between the forward extremity of the strut 2 and the extension member 10, being connected to the latter by means of the pivot bolt 12. With this arrangement, a third point support and guiding connection for the brake beam is provided, such as will guide the brake shoes into proper contact with the wheels when the brakes are set. At the same time, the resilient member 10, by virtue of its elasticity, will yield the necessary amount at the setting of the brakes, to accommodate the movement of the beam and to avoid its being pulled out of line by virtue of its connection to the brake rod. This attachment is susceptible of being easily applied to equipment not specially designed for the third point support feature.

In Figs. 2, 3 and 4 are illustrated the parts forming a modified embodiment of my invention and in which the extension member is in the form of a bar member 10' bifurcated at one extremity so as to fit over and receive the extremity of rod 9, and bifurcated at its other extremity for the reception of a resilient connecting link 15 which is pivoted on the bar member 10' by a pivot bolt 16, and on the strut 2 by a pivot bolt 17. In this modification, a special form of attaching means resides in the provision of the lips 18 at the upper and lower edges of the bifurcated portion of the bar member 10', which lips fit over and under the upper and lower margins of the connected extremity of the rod 9, and the pin 19 which forms the pivotal connection between the rod 9 and the brake lever 8, is also the means for retaining the bar member 10' on the rod 9. The resilient link 15 is so formed and shaped as to give the necessary elasticity to accommodate the movement of the brake beam without its being forced out of alinement.

The modification illustrated in Figs. 5 and 6 comprises in a sense the combination of the two forms above described, in that the extension member includes a seat portion 20 which is designed for attachment to the rod 9 in the manner described with reference to Figs. 2 and 3, and also a resilient member 21 which is supported at one extremity by the seat member 20 and has its other extremity shaped and connected to the link 14 in the manner above described with reference to the form illustrated in Fig. 1.

In the use of all of these forms of attachments, it will be observed that no alteration of the previous equipment is required, and that an effective third point support is provided which affords the proper flexible suspension for the brake beam, and which may be readily detached to facilitate unhanging and rehanging of the brake beam for purpose of repair.

I am aware that my invention is susceptible of embodiment in still other forms not herein specifically described but comprehended nevertheless within the scope of the appended claims.

What I claim is:

1. In a brake rigging, a third point support attachment including an extension member arranged for attachment at one extremity to the brake lever connecting rod and supporting at its other extremity an upwardly directed link having pivotal connection with the brake beam.

2. In a brake rigging, a third point connection including a resilient extension member arranged for connection at one extremity to a brake lever connecting rod and equipped at its other extremity for oscillatory connection with the associated brake beam.

3. In a brake rigging, a third point connection including an extension member arranged for attachment at one extremity to the brake lever connecting rod in such position that its other extremity projects beyond the brake beam substantially on the axis of said rod, said extension member having oscillatory connection at said other extremity with the brake beam.

4. In a brake rigging, a third point supporting connection including an extension member arranged to be detachably affixed at one extremity to the brake lever connecting rod whereby it extends from said rod substantially on the axis thereof, and a link forming an oscillatory connection between the associated brake beam and the other extremity of said extension member.

5. In a brake rigging, the combination of a brake beam, a brake lever operatively connected thereto, a brake rod operatively connected to the said lever, an extension member connected to the rod at its connection to to the lever, and a third point supporting member pivotally connecting the brake beam and the extension member.

6. In a brake rigging, an extension member arranged for connection to the brake rod at its point of connection to the brake lever, and an oscillatory member having pivotal connection with the brake beam and the extension member, one of said members being flexible to accommodate movement of the brake beam.

In testimony whereof I hereunto affix my signature in the presence of two witnesses, this 9th day of February, 1917.

CHARLES HAINES WILLIAMS.

Witnesses:
 EDWIN G. BUSSE,
 E. T. WALKER.